United States Patent [19]

Ando et al.

[11] 4,233,327

[45] Nov. 11, 1980

[54] PROCESS FOR PRODUCING INSTANT-COOKING RICE

[75] Inventors: Momofuku Ando, Osaka; Junichi Minami, Tondabayashi; Mitsumune Takata, Kusatsushi; Fumio Ohnishi, Osaka; Shunichi Kawamoto, Kusatsushi, all of Japan

[73] Assignee: Momofuku Ando, Osaka, Japan

[21] Appl. No.: 918,920

[22] Filed: Jun. 26, 1978

Related U.S. Application Data

[63] Continuation of Ser. No. 765,000, Feb. 2, 1977, abandoned, which is a continuation-in-part of Ser. No. 609,728, Sep. 2, 1975, abandoned.

[30] Foreign Application Priority Data

Sep. 5, 1974 [JP] Japan .................................. 49/102637
Sep. 30, 1974 [JP] Japan .................................. 49/112989

[51] Int. Cl.² .................................................. A23L 1/18
[52] U.S. Cl. .................................... 426/242; 426/625; 426/450; 426/462

[58] Field of Search ............... 426/242, 244, 445, 450, 426/459–462, 618–621, 625, 243

[56] References Cited

U.S. PATENT DOCUMENTS

| 2,696,158 | 12/1954 | Shuman | 426/450 |
|---|---|---|---|
| 2,733,147 | 1/1956 | Ozai-Durrami | 426/462 |
| 2,808,533 | 10/1957 | Hickus | 426/450 |
| 2,975,058 | 3/1961 | Colarussa | 426/462 |
| 3,914,454 | 10/1975 | Talcatsu | 426/462 |

Primary Examiner—Hiram H. Bernstein
Attorney, Agent, or Firm—Armstrong, Nikaido, Marmelstein & Kubovcik

[57] ABSTRACT

Process for producing instant-cooking rice which includes soaking rice in water, gelatinizing the soaked rice, reducing its water content 25–35% by weight, pressing the rice, reducing the water content of the pressed rice to 8–25% by weight, aging the rice and then puffing and drying the rice by hot air or high frequency dielectric heating.

5 Claims, 10 Drawing Figures

FIG. 1B(3)
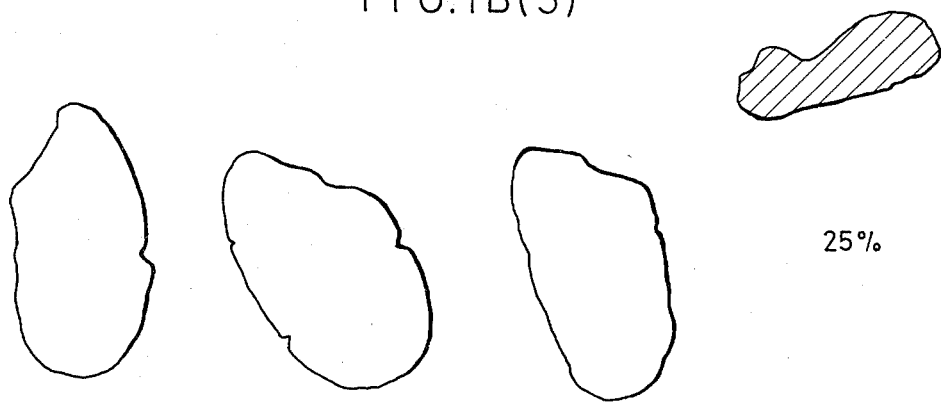
25%
FIG. 1B(4)
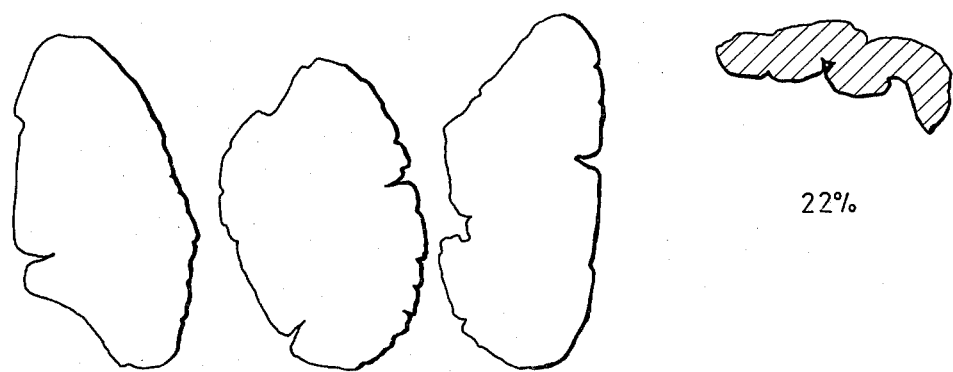
22%

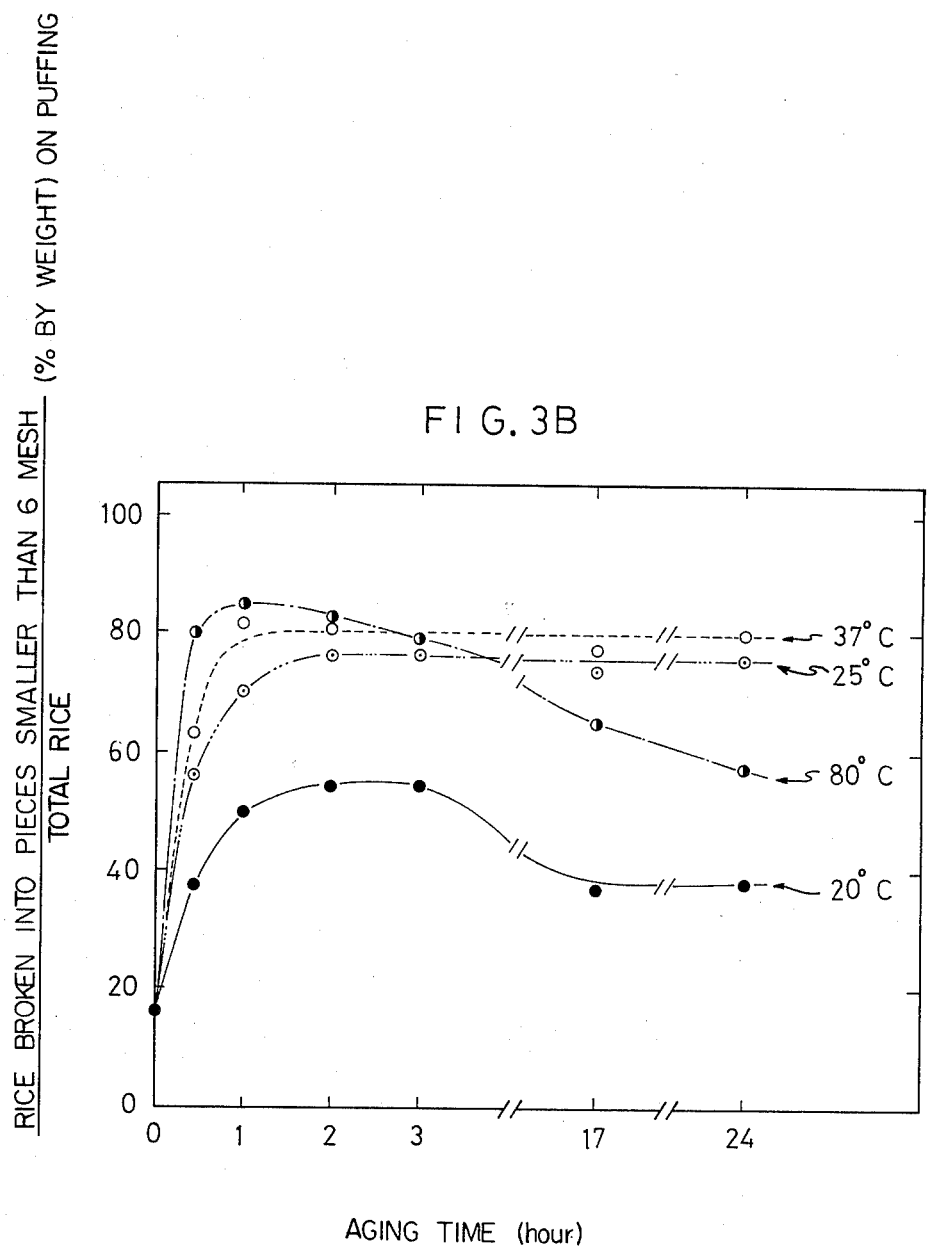

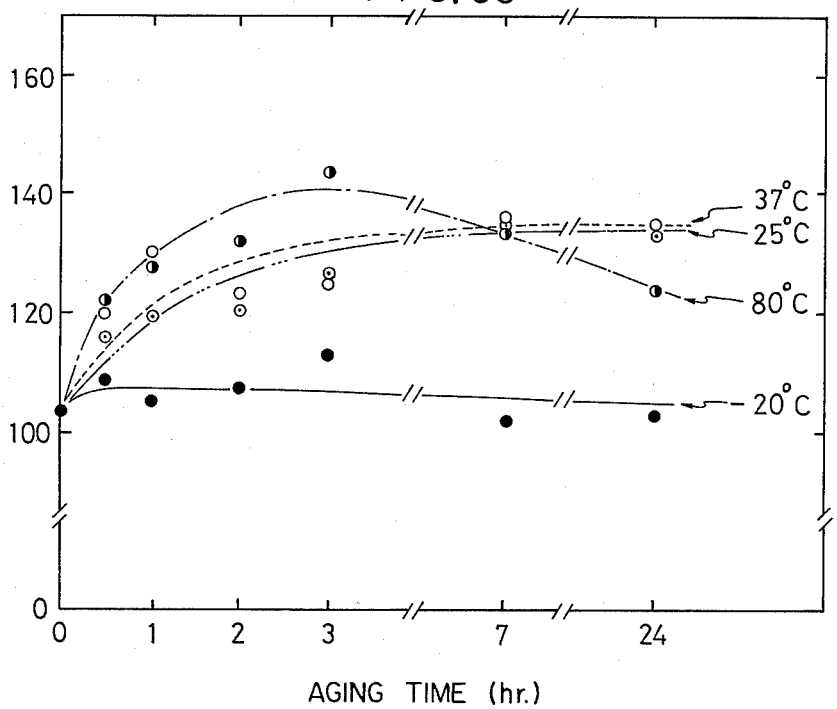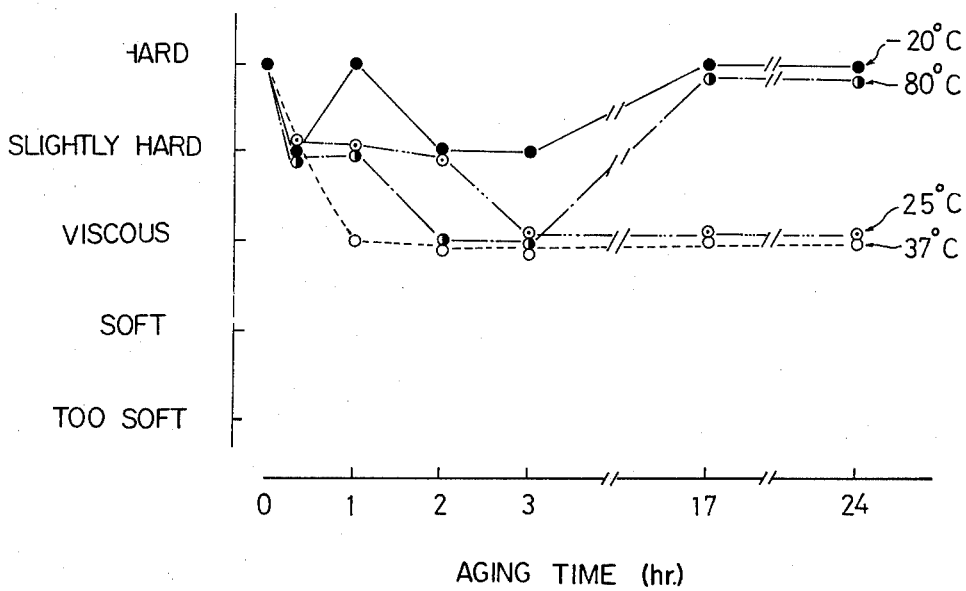

PROCESS FOR PRODUCING INSTANT-COOKING RICE

This is a continuation of application Ser. No. 765,000 filed Feb. 2, 1977, now abandoned, and which is a continuation-in-part of application Ser. No. 609,728 filed Sept. 2, 1975, and now abandoned.

BACKGROUND OF THE INVENTION

This invention relates to a process for manufacturing instant-cooking rice, which is storable over a long period of time, and which can be reconstituted into a food preparation as palatable as home-cooked rice a few minutes after hot water is poured thereon.

Although studies and developments have been made in the field of instant-cooking rice and these rice products are now on the market, they have not yet gained popularity in Japan.

The following may be considered as the main reasons thereof:

(a) Individual rice kernels, even if they are of the same kind, differ in size, composition or ingredients, etc. These differences affect heat transfer and water permeation, resulting in half-cooked rice and mixed kernels each having a different taste or feeling.

(b) Prior instant-cooking rice is reconstituted or restored by either boiling in a pan or a cookpot for few minutes, or by pouring hot water thereon and leaving it as it is for more than 10 minutes. The prior products which are restored by boiling in a pan or a cookpot may not be always restored in a constant state, even if they are the same products, due to slight differences in pan size, water amount, fire intensity, etc. On the other hand, the prior products which are restored with hot water may require a period of time longer than ten minutes for restoration.

SUMMARY OF THE INVENTION

A main object of the present invention is to provide a process for producing instant-cooking rice, which may be processed at lower temperatures and in less complicated steps as compared with the prior art, and which can be restored to rice as palatable as home-cooked rice a few minutes after hot water is poured thereon.

Another object thereof is to provide instant-cooking rice which is storable over a long period of time, which will permit hot water to permeate the interior of the rice tissue a few minutes after hot water is poured thereon, which will have no core, and when restored will be as palatable as the home-cooked rice.

A further object thereof is to provide instant-cooking rice which can be prepared by a very simple method of pouring hot water thereon, thus requiring no cooking means such as pans or cooking pots for preparation or consumption, and which will always turn out the same, no matter who cooks it, therefore palatable rice can be obtained wherever hot water is available.

A further object thereof is to provide instant-cooking rice which is preferably packed in a heat-insulating container, is portable, and is widely applicable for emergency and leisure use.

These and other objects will be understood from the following detailed description of the specific embodiment of this invention.

BRIEF EXPLANATION OF THE DRAWINGS

FIGS. 1A to 1B(1-4) are perspective and cross-sectional views of the rice grains before pressing (A) and the pressed rice grains (B) which have been dried to various extent before the pressing;

FIGS. 3A to 3D are graphical representations showing various results of aging.

DETAILED DESCRIPTION OF THE INVENTION

Any kind of rice may be treated in accordance with the present invention.

First, after the rice is washed in water, it is soaked in water or seasoning liquid, so that its water content is adjusted to 20-35%, preferably 30-34% by weight, and it is preferably then mixed with surfactants such as glycerine fatty acid esters, sugar esters and sorbitan ester or edible oil or However, the mixation of surfactants etc. is not essential. Finally, the rice is gelatinized by steaming or boiling. Since the surfactant, edible oil or talc is added to prevent the rice grains from sticking to each other during the steaming and pressing processes, a small quantity, for example 0.1-1.0% by weight, of such additives will suffice for this purpose. The grains are completely gelatinized by being treated for 0.5-6 minutes with steam of a temperature within the range from 100° at pressure of 1.03 Kg/cm$^2$ to 140° C. at a pressure of 3.68 Kg/cm.

Next, the gelatinized rice is exposed to air at a temperature of preferably 40°-120° C., so that the water content of the rice is reduced to 25-35% by weight before it is pressed. The reduction of the water content may, instead of being done by such ventilation, be done by adding cereal flour such as dry wheat flour, rice flour or starch etc., cellulose powder or talc to the rice to absorb excess water. Since steamed grains, if immediately fed into a pressing machine, will adhere to each other as well as to the walls of the machine, they should be dehydrated to a moisture content of preferably less than 35% by weight before being pressed.

Figure 1A:
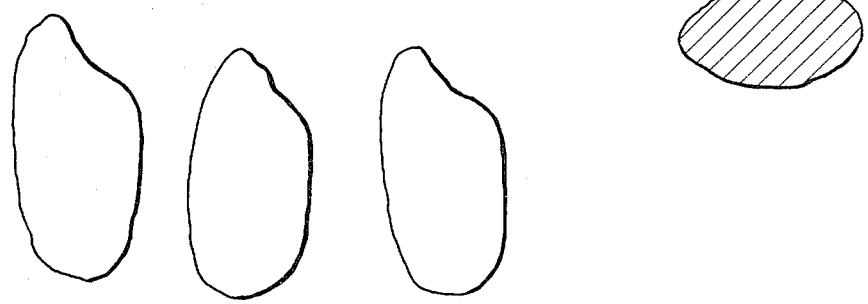
Figure 1A:
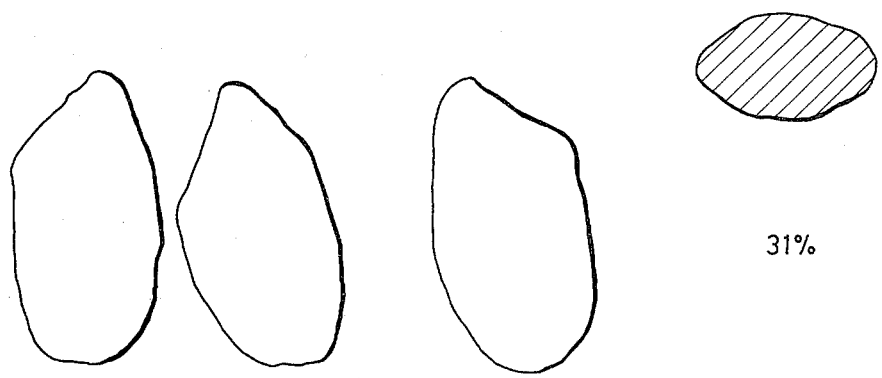
Figure 1A:
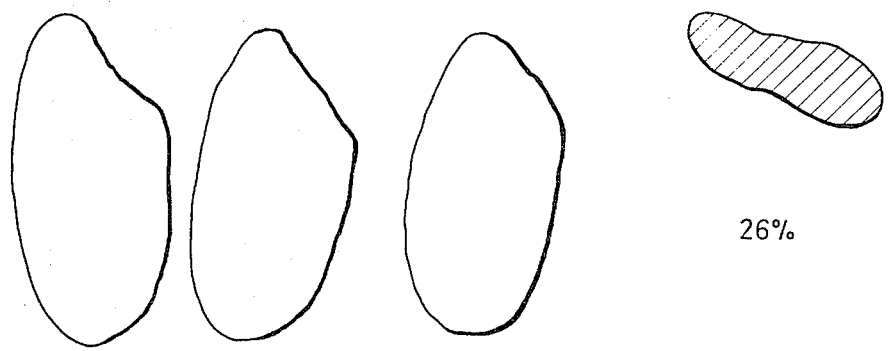
Figure 2:
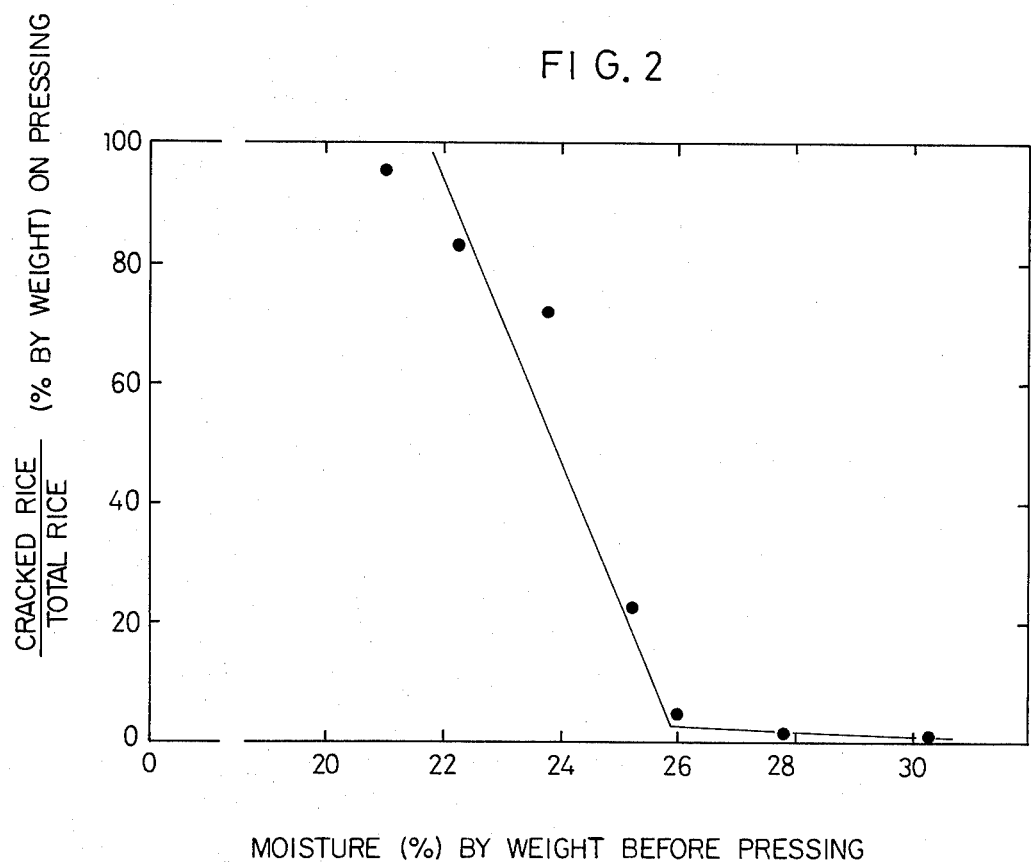
FIG. 2 is a graphical representation of the cracked grains on pressing similar to FIGS. 1A and 1B(1-4)

It is essential that the grains be pressed without producing cracks and fissures therein since the cracked grains may break into small pieces when puffed, thereby reducing the commercial value as rice products. If the moisture has been reduced to 25% or less by weight before pressing, the pressed grains will have cracks and fissures as shown in FIGS. 1 and 2, the results of which were obtained with rice processed up to pressing according to Example 1 which will be disclosed later. The conditions of drying before the pressing were the parameters of rice shown in FIGS. 1 and 2. U.S. Pat. No. 2,733,147 discloses soaking, gelatinizing, drying, compressing and drying rice, but also discloses that the compression results in the formation of cracks and fissures within the grains at column 5, lines 10-12.

As for pressing rice grains, any type of compressing apparatus may be applied. The pressing method includes a method of pressing the rice grains in two directions, such as by passing them between rolls or by means of metal plates, and a method of pressing the rice grains in all directions, such as by means of a rice sweeper, an extruding machine or a mixer. In a rice sweeper, the rice grains, after being fed into the machine, are pressed in all directions and moved for discharge while turning and spinning. The distance between the rolls is preferably 0.1-1.0 mm.

When pressed, the starch tissues in secure or fixed relation in the rice are loosened, thus resulting in a slide between the tissues so that the starch tissues become resilient and soft in structure, thereby causing slight gaps between the tissues. In other words, a number of small particles are formed within the tissue of each rice grain so that the rice becomes resilient enough to easily expand and contract when force is exerted thereagainst and so that it will restore almost to its original shape when the force is removed, like rubber. Accordingly, no core is created in the pressed rice, so heat transfer and water permeation will be improved, thus enabling its quick and uniform restoration when cooked, with hot water, and permitting the puffing and drying process to proceed at a relatively low temperature after the pressing process.

The pressed rice grains are then put through the final process, namely puffing or drying. In order to facilitate the puffing, it is preferred to expose the grains to air at a temperature of 20° to 100° C. to preliminarily dry them to reduce the water content, preferably to 8 to 25% before puffing.

Since each of the preliminarily dried grains has a moisture distribution which tends to be moister toward its cent the grains are aged to unify or equalize the moisture distribution. It is preferable that the aging be carried out within a closed chamber to prevent natural or atmospheric dehydration of the grains. The aging time and temperature depend on each other as shown in Table 1. For example, aging at a temperature above 80° C. for longer than 17 hours causes the grains to turn yellow while aging below 5° C. or for shorter than 30 minutes has no effect. The most preferable temperatures range from 15° C. to 35° C.

TABLE 1

| Aging Temperature (°C.) | Aging Time (hour) |
| --- | --- |
| 5-15 | longer than 3 |
| 25 | longer than 2 |
| 37 | longer than 1 |
| 80 | 0.5-17 |

Figure 3A:
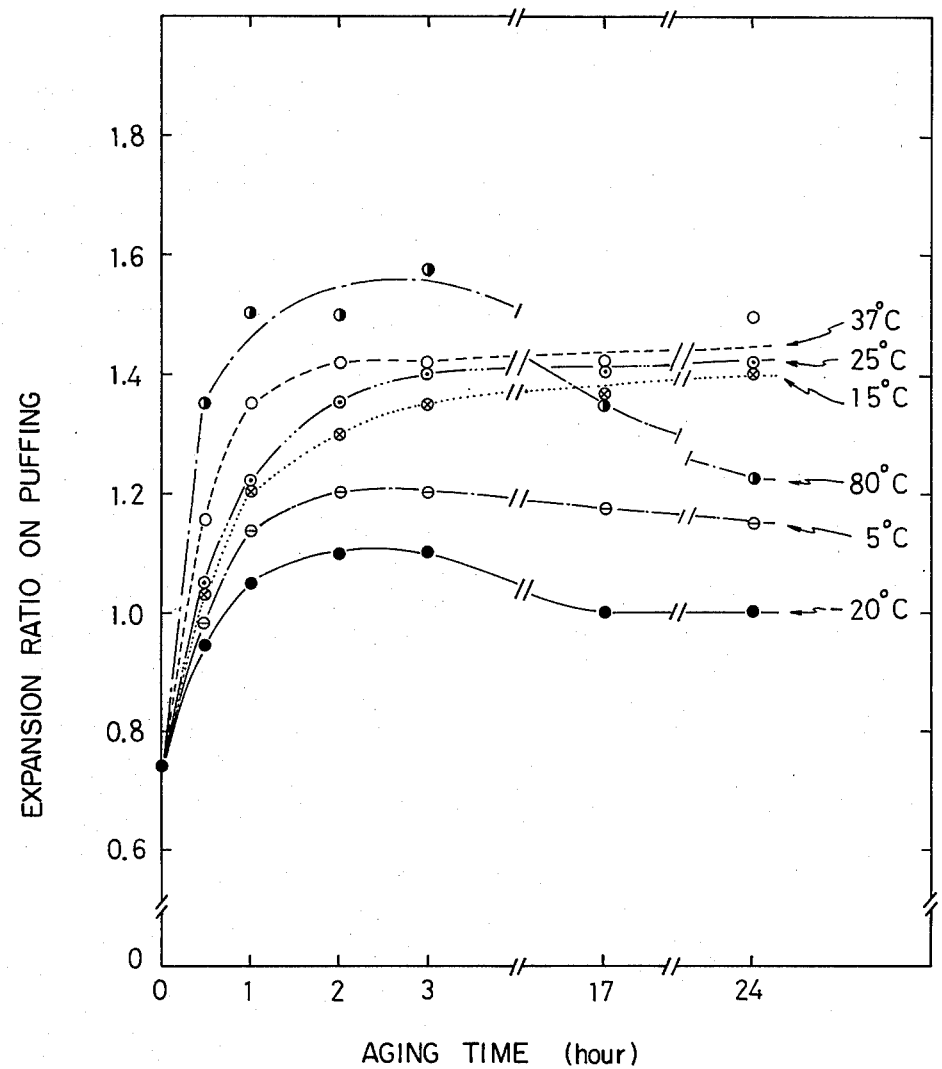

The properly aged grains can be puffed into a greater size (FIGS. 3A and 3B) with uniformity across each grain in the subsequent puffing process. Such well aged puffed rice will absorb a greater amount of hot water on subsequent cooking (FIG. 3C) and therefore be cooked to be viscous textured (FIG. 3D). The results of FIGS. 3A-D were obtained with rice processed up to puffing according to Example 1 except conditions of aging which are the parameters of the graphs.

The final puffing or drying is carried out with a hot air blast at a temperature of preferably 160° to 450° C., or by dielectric heating at a high frequency within the range of preferably 300 to 3000 Mc/s. The temperature of the hot air, electric power, frequency, period etc. for the process are adjusted relative to the amount of pressed rice and its water content.

The instant-cooking rice manufactured in accordance with the invention is packaged into a heat-insulating container with powdered soup or dried food materials such as vegetable or meat, etc. added as necessary for each of the various foodstuffs to be prepared, e.g., pilaf, curried rice, or "chicken and rice" etc. which will be prepared 3-5 minutes after hot water is poured thereon.

EXAMPLE 1

Two kilograms of rice is washed and soaked in water for 4 hours. After the water is drained off, the wet rice is mixed with 8 g of sugar ester and steamed at a steam pressure of 1.4 Kg/cm$^2$ for 7 minutes. The steamed rice is dried with 60°-80° C. hot air to a water content of 27% by weight and is then pressed between rolls spaced a distance of 0.2 mm apart. The pressed rice is dried with 60°-80° C. hot air to a water content of 17%, and then, the dried rice is aged at 20° C. for 15 hours in a closed chamber. This aged rice is finally processed in a puffing or drying process with a 235° C. hot air blast at a velocity of 8 meters/sec. for 23 seconds, thereby forming the instant-cooking rice.

EXAMPLE 2

Two kilograms of rice is washed and soaked in seasoning liquid for 15 hours. After draining the water, the rice with a water content of 30% by weight is mixed with 20 g of monoglyceride and steamed under a steam pressure of 1 kg/cm$^2$ for 10 minutes. The steamed rice is dried with 60°-80° C. hot air to a water content of 28% by weight and pressed between rolls spaced a distance of 0.4 mm apart. This pressed rice is dried with 60°-80° C. hot air to a water content of 12%, and the dried rice is aged at 30° C. for 5 hours in a closed chamber. Finally, the aged rice is puffed by dielectric heating with a microwave (600 W, 2450 Mc/s) for 60 seconds, thereby forming the instant-cooking rice.

The thus produced instant-cooking rice, which, for marketing, may be packaged in an envelope or a heat-insulating container, will be reconstituted into a food preparation, for example, as follows:

ORDINARY RICE 300 cc of hot water is poured directly over 80 grams of the rice product having been packed in a 500 cc foamed styrene container. Palatable rice is ready to eat five minutes after quickly removing the water.

SHRIMP PILAF 300 cc of hot water is mixed with 100 g of the rice product, 2 g of freeze-dried shrimps, 1 g of freeze-dried carrot, 2 g of freeze-dried green peas and 1 g of freeze-dried onion having been packaged together in a 500 cc foamed styrene container. Five minutes after the water is removed, 8 g of rice oil and 4 g of powdered seasoning respectively wrapped with plastic film are then mixed thereinto and stirred using a spoon, thus preparing palatable "shrimp pilaf".

CHICKEN AND RICE 300 cc of hot water is mixed with 100 g of the rice product, 2 g of freeze-dried chicken meat, 5 g of freeze-dried carrot, 1.5 g of freeze-dried onion and 2.5 g of freeze-dried green peas having been packaged together in a 500 cc foamed styrene container. Four minutes after the water is removed, 10 g of rice oil and 15 g of powdered seasoning respectively wrapped with plastic film are then mixed therewith and stirred using a spoon, thus preparing palatable "chicken and rice".

CREAM STEW AND RICE 230 cc of hot water is mixed with 65 g of the rice product, 4 g of freeze-dried pork, 1.5 g of freeze-dried onion, 2.5 g of freeze-dried green peas, 10 g of gelatinized flour, 10 g of dextrin and 10 g of powdered seasoning having been packaged together in a 400 cc foamed styrene container. Palatable "cream stew and rice" is prepared 4 minutes after the mixture is stirred.

What is claimed is:

1. A process for preparing instant-cooking rice consisting essentially of the steps of:
   (a) soaking rice in water or seasoning liquid so that its water content is 20–35% by weight;
   (b) mixing the soaked rice with 0.1–1.0% by weight of a surfactant, edible oil or talc;
   (c) completely gelatinizing the soaked rice with steam at a temperature of 100°–140° C.;
   (d) reducing the moisture content of the gelatinized rice to 25–35% by weight by exposing it to air at a temperature of 40°–120° C.;
   (e) pressing the reduced-moisture containing gelatinized rice between rolls spaced from 0.1–1.0 mm apart without producing cracks and fissures therein;
   (f) drying the pressed rice to 8–25% by weight be exposing it to air at a temperature of 20°–100° C.;
   (g) aging the dried rice in a closed chamber at a temperature of 15°–35° C. for at least 30 minutes to equalize the moisture distribution within the grains; and
   (h) puffing the aged rice with hot air at a temperature of 160°–450° C.

2. A process for preparing instant-cooking rice consisting essentially of the steps of:
   (a) soaking rice in water or seasoning liquid so that its water content is 20–35% by weight;
   (b) mixing the soaked rice with 0.1–1.0% by weight of a surfactant, edible oil or talc;
   (c) completely gelatinizing the soaked rice with steam at a temperature of 100°–140° C.;
   (d) reducing the moisture content of the gelatinized rice to 25–35% by weight by exposing it to air at a temperature of 40°–120° C.;
   (e) pressing the reduced-moisture containing gelatinized rice between rolls spaced from 0.1–1.0 mm apart without producing cracks and fissures therein;
   (f) drying the pressed rice to 8–25% by weight by exposing it to air at a temperature of 20°–100° C.;
   (g) aging the dried rice in a closed chamber at a temperature of 15°–35° C. for at least 30 minutes to equalize the moisture distribution within the grains; and
   (h) puffing the aged rice by high frequency dielectric heating at a frequency of 300–3000 Mc/s.

3. A process as claimed in claim 1 or 2, wherein the gelatinization is carried out under conditions ranging from steaming at a temperature of 100° C. and pressure of 1.03 kg/cm$^2$ to steaming at a temperature of 140° C. and pressure of 3.68 kg/cm.

4. A process as claimed in claim 2, wherein the gelatinization is carried out for 0.5–60 minutes.

5. A process as claimed in claim 1 or 2, wherein the aging is performed for 0.5–17 hours.

* * * * *

UNITED STATES PATENT AND TRADEMARK OFFICE
CERTIFICATE OF CORRECTION

PATENT NO. : 4,233,327
DATED : November 11, 1980
INVENTOR(S) : Momofuku ANDO ET AL It is certified that error appears in the above-identified patent and that said Letters Patent are hereby corrected as shown below:

Cover page, left column, the name of the third inventor should read --Mitsumune Takatsu--.

Fig. 3B, the description of the ordinate should read --RICE EXPANDED LARGER THAN 6 MESH--.

Signed and Sealed this

Seventeenth Day of November 1981

[SEAL]

Attest:

Attesting Officer

GERALD J. MOSSINGHOFF

Commissioner of Patents and Trademarks